(12) United States Patent
Derr et al.

(10) Patent No.: US 6,275,887 B1
(45) Date of Patent: Aug. 14, 2001

(54) METHOD AND APPARATUS FOR TERMINATING A BUS TRANSACTION IF THE TARGET IS NOT READY

(75) Inventors: Michael N. Derr, Folsom; Robert J. Riesenman, Sacramento, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/271,616

(22) Filed: Mar. 17, 1999

(51) Int. Cl.[7] ........................................ G06F 13/36
(52) U.S. Cl. ............................................. 710/129
(58) Field of Search ................................... 395/290, 293, 395/306; 710/110, 107, 100, 113, 128, 131, 126, 129; 711/154, 163

(56) References Cited

U.S. PATENT DOCUMENTS

| | | | | |
|---|---|---|---|---|
| 5,594,882 | * | 1/1997 | Bell ...................................... | 711/212 |
| 5,706,471 | * | 1/1998 | Futral .................................. | 710/107 |
| 5,761,444 | * | 6/1998 | Ajanovic et al. .................... | 710/100 |
| 5,857,081 | * | 1/1999 | Furuta ................................. | 710/128 |
| 5,859,990 | * | 1/1999 | Yarch .................................. | 710/131 |
| 5,870,567 | * | 2/1999 | Hausauer et al. ................... | 710/101 |
| 5,878,239 | * | 3/1999 | Furuta ................................. | 710/129 |
| 5,887,194 | * | 3/1999 | Carson ................................ | 710/108 |
| 5,918,026 | * | 6/1999 | Melo ................................... | 710/128 |
| 5,943,483 | * | 8/1999 | Solomon ............................. | 710/107 |
| 5,954,802 | * | 9/1999 | Griffith ................................ | 710/22 |

* cited by examiner

*Primary Examiner*—Glenn A. Auve
(74) *Attorney, Agent, or Firm*—Blakely, Sokoloff, Taylor & Zafman LLP

(57) ABSTRACT

One embodiment of the present invention is a PCI bus target device. The PCI bus target device includes a first circuit, a second circuit, a third circuit, and a fourth circuit. The first circuit is configured to determine whether the PCI bus target device is the target of a first transaction initiated by a first PCI bus master device. The second circuit is configured to determine whether the PCI bus target device is ready to complete the first transaction. The third circuit is configured to determine whether a second PCI bus master device is ready to initiate a second transaction. The fourth circuit is configured to terminate the first transaction if the PCI bus target device is the target of the first transaction and is not ready to complete the first transaction and the second PCI bus master device is ready to initiate the second transaction.

20 Claims, 2 Drawing Sheets

METHOD AND APPARATUS FOR TERMINATING A BUS TRANSACTION IF THE TARGET IS NOT READY

FIELD OF THE INVENTION

The invention relates to the field of bus architecure, and more particularly to the field of increasing bus utilization in an electronic system.

BACKGROUND OF THE INVENTION

It is often possible to increase the performance of an electronic system by increasing the utilization of a bus in the system. For example, it might be possible to increase the performance of a computer system having a Peripheral Component Interconnect (PCI) bus according to the PCI Local Bus Specification, Revision 2.1, published July 1995, by increasing the utilization of the PCI bus.

According to a well known approach, wait states are inserted into a pending PCI transaction when the device that is the target of the transaction is not ready to complete the transaction. Wait states continue to be inserted until either the target is ready to complete the transaction or a timer in the target expires. In either case, the bus is not available for other transactions during the pending transaction. If another bus master is ready to initiate another transaction during the pending transaction, then a potential increase in bus utilization will be lost. Also, in the case of termination due to an expiring timer, a potential increase in bus utilization will be lost if the target would have been ready to complete the transaction after the timer expires but before another bus master is ready to initiate a transaction.

Therefore, a novel approach to terminating a bus transaction if the target is not ready has been developed.

SUMMARY OF THE INVENTION

A bus target device is disclosed. The bus target device includes a first circuit, a second circuit, a third circuit, and a fourth circuit. The first circuit is configured to detect whether the bus target device is the target of a first transaction initiated by a first bus master device. The second circuit is configured to determine whether the bus target device is ready to complete the first transaction. The third circuit is configured to determine whether a second bus master device is ready to initiate a second transaction. The fourth circuit is configured to terminate the first transaction if the bus target device is the target of the first transaction and is not ready to complete the first transaction and the second bus master device is ready to initiate the second transaction.

DETAILED DESCRIPTION OF A PREFERRED EMBODIMENT

A novel approach to terminating a bus transaction if the target is not ready is described. In the following description, specific details are set forth in order to provide a thorough understanding of the present invention. It will be apparent, however, to one skilled in the art that the invention can be practiced without regard to these specific details. In other instances, well known concepts have not been described in particular detail in order to avoid obscuring the present invention.

One embodiment of the present invention is a PCI bus target device. The PCI bus target device includes a first circuit, a second circuit, a third circuit, and a fourth circuit. The first circuit is configured to determine whether the PCI bus target device is the target of a first transaction initiated by a first PCI bus master device. The second circuit is configured to determine whether the PCI bus target device is ready to complete the first transaction. The third circuit is configured to determine whether a second PCI bus master device is ready to initiate a second transaction. The fourth circuit is configured to terminate the first transaction if the PCI bus target device is the target of the first transaction and is not ready to complete the first transaction and the second PCI bus master device is ready to initiate the second transaction.

Unlike the prior approach, if a target device according to the present invention is not ready to complete a transaction, the target device does not continue to insert wait states into the transaction until either the target device is ready to complete the transaction or a timer in the target device expires. Instead, the target device terminates the current transaction if another bus master is ready to initiate another transaction and the target device is not ready to complete the current transaction. Therefore, a potential increase in bus utilization can be realized.

Also unlike the prior approach, a target device according to the present invention will not terminate a transaction unless another bus master is ready to initiate another transaction. Therefore, the transaction might be completed instead of terminated after a fixed time and retried. Again, a potential increase in bus utilization can be realized.

Figure 1:
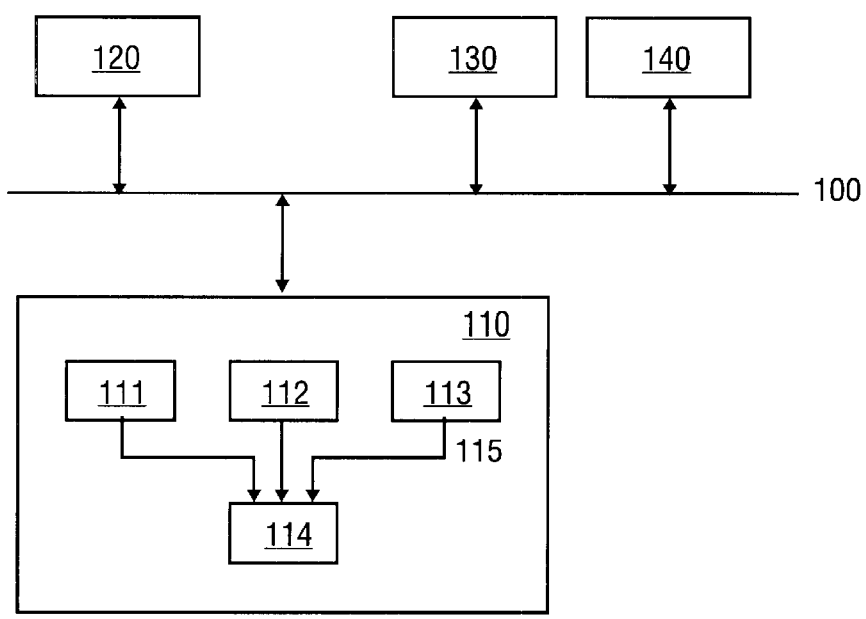
FIG. 1 is a block diagram illustrating an embodiment of the apparatus of the present invention.

FIG. 1 is a block diagram of one embodiment of the apparatus of the present invention. In FIG. 1, device 110 is a bus target device residing on bus 100. Although bus 100 can be any of a variety of busses in any of a variety of electronic systems within the scope of the present invention, in this embodiment, bus 100 is a PCI bus in a computer system. Bus master devices 120, 130, and 140 also reside on bus 100. Device 110 includes circuit 111 configured to determine whether device 110 is the target of a transaction, circuit 112 configured to determine whether device 110 is ready to complete a pending transaction, and circuit 113 configured to determine whether a bus master device that is not the master of a pending transaction is ready to initiate another transaction.

Circuit 111 can be implemented according to any of a variety of approaches, such as any well known approach used by a target device to determine whether to assert the PCI "DEVSEL#" (device select) signal by decoding the address of the transaction. Circuit 112 also can be implemented according to any of a variety of approaches, such as any well known approach used by a target device to determine whether to assert the PCI "TRDY#" (target ready) signal. In one embodiment, circuit 112 is configured to determine whether device 110 is ready to provide data to complete a read transaction. In another embodiment, circuit 112 is configured to determine whether device 110 is ready to accept data to complete a write transaction.

Circuit 113 also can be implemented according to any of a variety of approaches, such as any well known approach used by a bus arbiter to determine whether there is an outstanding request for the bus. In one embodiment, circuit 113 is configured to generate an "OTHER_REQUEST"

signal on signal line 115 that indicates that there is an outstanding request for the bus. The OTHER_REQUEST signal is asserted when any PCI REQ# (request) signal, not including the PCI REQ# signal corresponding to the current PCI bus master, is asserted. In the embodiment of FIG. 1, OTHER_REQUEST is asserted if device 120 is the current PCI bus master and REQ# from either or both of devices 130 and 140 is asserted, or device 130 is the current PCI bus master and REQ# from either or both of devices 120 or 140 is asserted, or device 140 is the current PCI bus master and REQ# from either or both of devices 120 or 140 is asserted.

Device 110 also includes circuit 114 configured to terminate a pending transaction if device 110 is the target of a transaction and is not ready to complete the transaction and a bus master device that is not the master of the transaction is ready to initiate another transaction. Circuit 114 can be implemented according to any of a variety of approaches, such as any well known approach to logic design. In one embodiment, circuit 114 is configured to terminate a transaction according to the PCI retry protocol if circuit 111 has determined that device 110 is the target of a transaction, circuit 112 has determined that device 110 is not ready to complete the transaction, and circuit 113 has determined that another bus master device is ready to initiate another transaction.

Figure 2:
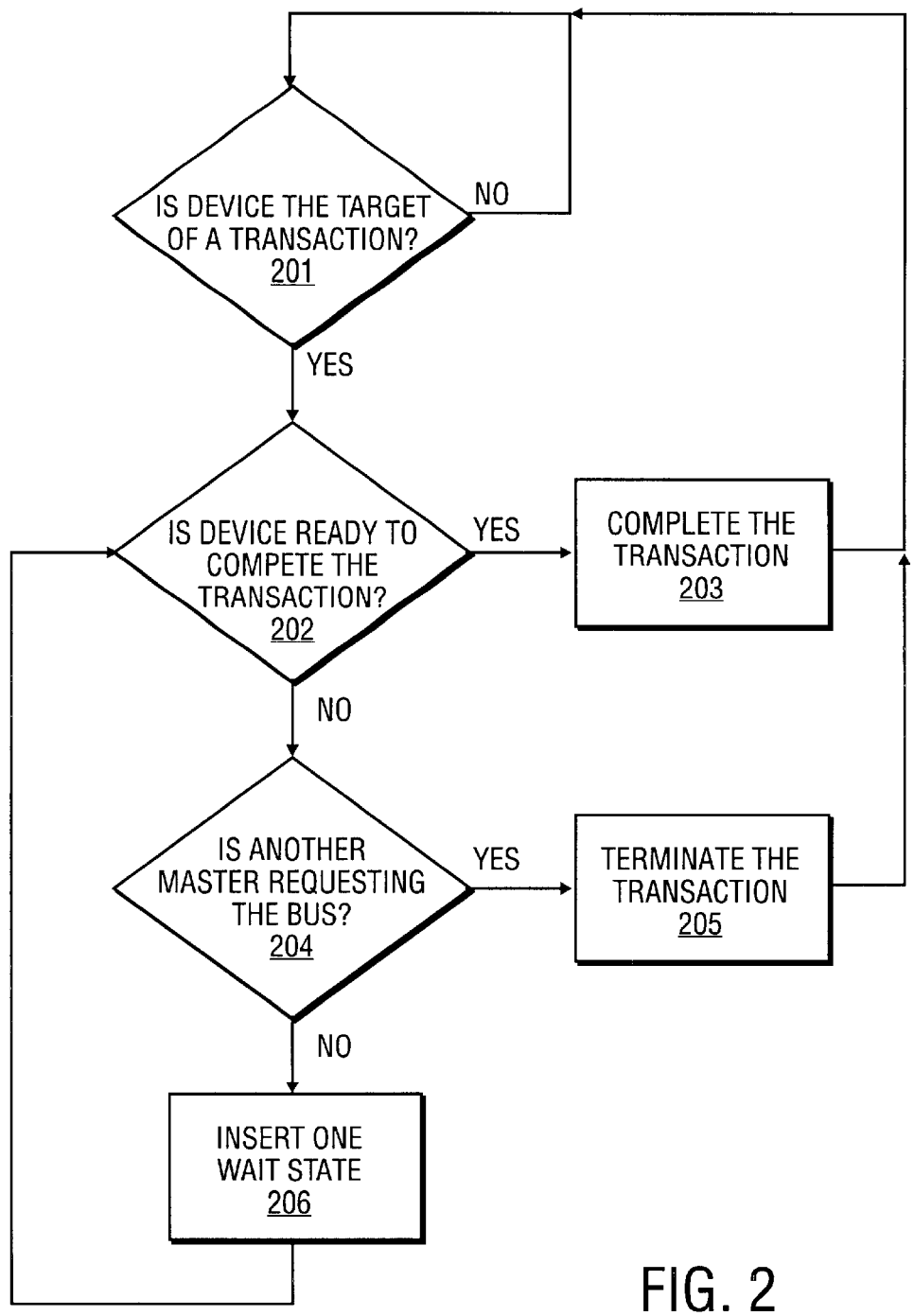
FIG. 2 is a flow chart illustrating an embodiment of the method of the present invention.

The operation of the above apparatus is illustrated in FIG. 2, a flow chart illustrating one embodiment of the method of the present invention. In step 201, circuit 111 determines whether device 110 is the target of a transaction. Step 201 can be accomplished by any of a variety of approaches. In one embodiment, step 201 is accomplished by decoding the command and address of a PCI cycle, determining that device 110 is the target, and asserting DEVSEL#. If device 110 is the target of the transaction, then step 202 is performed. If desired, one or more wait states can be inserted into the transaction between steps 201 and 202.

In step 202, circuit 112 determines whether device 110 is ready to complete the transaction. If so, then device 110 asserts TRDY# in step 203. If not, then step 204 is performed. In step 204, circuit 113 determines whether a bus master that is not the master of the transaction is requesting the bus. If so, then step 205 is performed. If not, then device 110 inserts one wait state into the transaction in step 206, by keeping TRDY# and the PCI STOP# (stop) signal deasserted. Following step 206, step 202 is performed again.

In step 205, circuit 114 terminates the transaction according to PCI retry protocol by asserting STOP#.

Thus, the exemplary embodiments of the present invention illustrated in FIGS. 1 and 2 have been described. However, the present invention is not limited to these embodiments or any of the details described. The specification and drawings must be regarded in an illustrative rather than a restrictive sense. The scope of the present invention is defined by the following claims.

What is claimed is:

1. An apparatus comprising:
   a first bus master device;
   a second bus master device; and
   a target bus device to terminate a first transaction initiated by the first bus master device based on a determination that the target bus device is a target of the first transaction and is not ready to complete the first transaction and the second bus master device is ready to initiate a second transaction with the target bus device.

2. The apparatus of claim 1, wherein the first and second bus master devices include peripheral component interconnect (PCI) bus master devices and the target bus device includes a PCI target bus device.

3. The apparatus of claim 1, wherein the first transaction includes a read transaction for the target bus device.

4. The apparatus of claim 1, wherein the first transaction includes a write transaction for the target bus device.

5. The apparatus of claim 1, wherein the target bus device is to insert a wait state for the first transaction based on a determination that the target bus device is a target of the first transaction and is not ready to complete the first transaction and the second bus master device is not ready to initiate a second transaction with the target bus device.

6. A method for a target bus device, the method comprising:
   terminating a first transaction initiated by a first bus master device based on a determination that the target bus device is a target of the first transaction and is not ready to complete the first transaction and a second bus master device is ready to initiate a second transaction with the target device.

7. The method of claim 6, further comprising:
   completing the first transaction based on a determination that the bus target device is ready to complete the first transaction.

8. The method of claim 6, further comprising:
   inserting a wait state for the first transaction based on a determination that the target bus device is a target of the first transaction and is not ready to complete the first transaction and a second bus master device is not ready to initiate a second transaction with the target device.

9. The method of claim 6, wherein terminating the first transaction includes terminating a read transaction.

10. The method of claim 6, wherein terminating the first transaction includes terminating a write transaction.

11. A bus target device comprising:
    a first circuit to determine if the bus target device is a target of a first transaction initiated by a first bus master device;
    a second circuit to determine if the bus target device is ready to complete the first transaction;
    a third circuit to determine if a second bus master device is ready to initiate a second transaction with the bus target device; and
    a fourth circuit to terminate the first transaction with the first bus master device based on the determination that the bus target device is the target of the first transaction and is not ready to complete the first transaction and the second bus master device is ready to initiate the second transaction with the bus target device.

12. The bus target device of claim 11, wherein the first transaction includes a read transaction and the second circuit is to determine if the bus target device is ready to provide data for the read transaction.

13. The bus target device of claim 11, wherein the first transaction includes a write transaction and the second circuit is to determine if the bus target device is ready to provide data for the write transaction.

14. The bus target device of claim 11, wherein the first and second bus master devices and the bus target device include peripheral component interconnect (PCI) devices.

15. The bus target device of claim 14, wherein the fourth circuit is to terminate the first transaction according a PCI retry protocol if the PCI bus target device is the target of the first transaction and is not ready to complete the first transaction and the second PCI bus master device is ready to initiate the second transaction with the PCI bus target device.

16. A digital processing system comprising:

one or more bus master devices; and one or more bus target devices, each bus target device is able to terminate a first transaction initiated by one of the bus master devices based on a determination that the target bus device is a target of the first transaction and is not ready to complete the first transaction and another bus master device is ready to initiate a second transaction with the target device.

17. The digital processing system of claim 16, wherein the bus master devices and the target devices include peripheral component interconnect (PCI) devices.

18. The digital processing system of claim 16, wherein the first transaction includes a read transaction for the bus target device.

19. The digital processing system of claim 16, wherein the first transaction includes a write transaction for the bus target device.

20. The digital processing system of claim 16, wherein the bus target device is to insert a wait state for the first transaction based on a determination that the bus target device is a target of the first transaction and is not ready to complete the first transaction and the another bus master device is not ready to initiate a second transaction with the target device.

* * * * *